United States Patent
Blackwell, Jr. et al.

(10) Patent No.: US 6,546,102 B2
(45) Date of Patent: *Apr. 8, 2003

(54) MULTI-CONFIGURABLE INTEGRAL PHONE SUPPORT

(75) Inventors: James L. Blackwell, Jr., Lawrenceville, GA (US); Grant H. Lloyd, Lawrenceville, GA (US); Willard F. Amero, Jr., Flowery Branch, GA (US)

(73) Assignee: Motorola Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,434

(22) Filed: Jul. 19, 1999

(65) Prior Publication Data

US 2002/0057793 A1 May 16, 2002

(51) Int. Cl.⁷ .................................. H04M 1/00
(52) U.S. Cl. ............................ 379/446; 455/455
(58) Field of Search ............................ 379/446, 454, 379/455, 426; 320/2, 115, 110

(56) References Cited

U.S. PATENT DOCUMENTS

| | | | | |
|---|---|---|---|---|
| 5,659,236 A | * | 8/1997 | Hahn | 320/2 |
| 6,049,192 A | * | 4/2000 | Kfoury et al. | 320/115 |

FOREIGN PATENT DOCUMENTS

| | | | | |
|---|---|---|---|---|
| JP | 406260158 A | * | 9/1994 | 320/110 |

* cited by examiner

Primary Examiner—Jack Chiang
(74) Attorney, Agent, or Firm—Philip H. Burrus, IV

(57) ABSTRACT

A charger with a mechanical support is provided for supporting an electronic device having batteries with different form factors. The mechanical support can be rotated to further support larger form factor electronic devices. Additionally, a mechanical support for insertion into a charger is provided for supporting electronic devices with varying form factors.

13 Claims, 6 Drawing Sheets

MULTI-CONFIGURABLE INTEGRAL PHONE SUPPORT

TECHNICAL FIELD

This invention relates generally to chargers for electronic devices, and more specifically to chargers with mechanical supports for cellular telephones.

BACKGROUND

Cellular phones are becoming more and more popular. Advances in technology have made phones smaller and more affordable. In fact, as of 1999, it is not uncommon to get 500 or more minutes of talk time per month for less than $25. Often, in order to sign customers to annual contracts, companies will actually give away cellular phones. As a result, while cellular telephones were once only used by the wealthy, they are becoming commonplace across all sectors of society.

Cellular telephones require batteries for portability. Rechargeable batteries are employed almost exclusively in cellular applications, as they can be recharged several hundred times, thereby saving battery replacement costs. The types of batteries in use differ quite considerably, however, due to the different demands of the users. For example, some people use phones only for emergencies. In this sense, they only talk on a phone for a few minutes per month. They are therefore able to get by with a small battery with limited energy storage capacity. A small, thin battery is preferred because it makes the phone smaller and lighter. Small phones are more easily carried in a pocket or purse.

Other users, like salesmen, may talk on cellular phones for many hours a day. Since they do not want to constantly recharge a battery, they might prefer a bigger, more bulky battery that has a higher energy storage capacity. Manufacturers like Motorola Inc. provide extended capacity batteries for their popular phones like the StarTac series. These larger, more bulky, yet higher energy batteries are often called "Auxiliary" or "Aux" batteries. They typically offer two to three times more capacity than do smaller, slimmer batteries.

In the end however, all batteries, no matter what size, must eventually be recharged. They can be charged in a number of ways. Some phone manufacturers, including Nokia and Motorola, sell power supplies that can be connected by a wire to the phone. People, however, often prefer to have a charger that can be placed on a table or desk. Companies therefore sell chargers that are designed to sit atop a desk and hold a phone while charging. The charger generally has a pocket into which the phone is inserted. Sometimes, the charger will have a second pocked for charging a spare battery.

The pocket must provide mechanical support for the phone. The phone typically sits in an easily viewable, upright position that allows it to receive incoming calls. A problem arises in that different batteries, slim and aux for example, cause the phone to take on different shapes, or form factors. For example, when a thin, low capacity battery is connected, the phone may only be 1 inch thick. However, when an aux battery is attached, the phone may now be 2 inches thick.

Chargers, in order to be versatile, must accommodate all the batteries that can be attached to the phone. One way to provide mechanical support is to provide a pocked large enough to accommodate a phone with the largest battery attached. Using this scheme, neither the phone nor the battery is supported by the plastic of the charger. Instead, the phone and charger have interlocking connectors. When the phone connector mates with the charger connector, the connector itself is responsible for providing the mechanical support. This scheme is illustrated in U.S. Des. Pat. No. 394,423. The problem with this scheme is that the connectors are generally not robust mechanical supports. They sometimes break, rendering the charger useless.

There is therefore a need for a charger with means for supporting a phone that accommodates a variety of battery sizes.

SUMMARY OF THE INVENTION

This invention is a charger with a phone pocket having a hinged mechanical support that provides support and mechanical stability to a phone. Several embodiments are herein described. The hinged mechanical support is constructed such that it accommodates the phone with a variety of different size batteries.

DETAILED DESCRIPTION OF THE INVENTION

Often, phone manufacturers like Motorola, Inc. will offer different size batteries for the same phone. These different batteries offer different amounts of energy storage. The greater the energy storage, the greater the talk time. Talk time is the amount of time that a phone can be used without recharging the battery. Generally, the greater the capacity, the greater the talk time, and the greater the thickness of the battery. In other words, capacity is usually proportional to talk time which is proportional to size.

Figure 1:
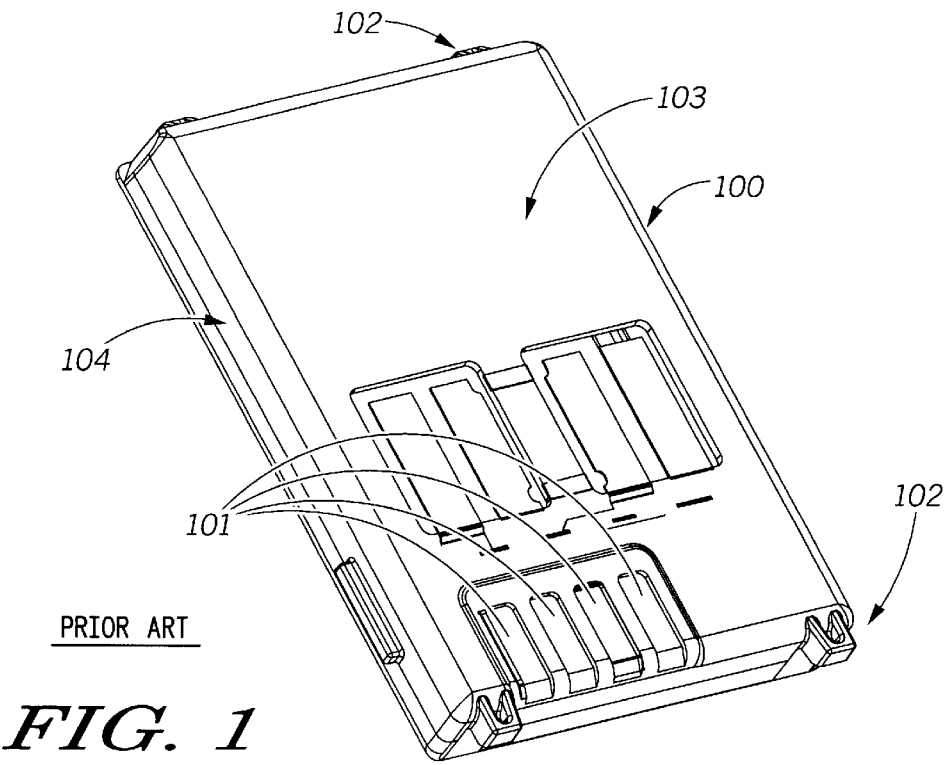
FIG. 1 is a slim battery, which is prior art, for reference purposes.

To better understand the present invention, a brief discussion about phones and various batteries is warranted. Referring now to FIG. 1, a standard battery 100 for a cellular phone is shown. This battery 100 has a front face 103 and a side face 104. The battery 100 includes mechanical tabs 102 for interconnecting to a phone. The battery 100 also includes electrical contacts 101 which are used to both charge the battery 100 and power a phone.

This type of battery 100 is often referred to as either a "standard" or "slim" battery. The term slim is used because this battery offers the most compact volume shape, or form factor, of all the available batteries. An example of a slim battery is the LGQ6 battery manufactured by Motorola for the V-series phone. This battery is about 6 mm thick. It offers a 500 mAh capacity, which corresponds to about an hour and a half of talk time. An alternate slim battery, the LGQ8, is also available that is 8 mm thick. The 8 mm battery, while thicker, offers more talk time.

Figure 2:
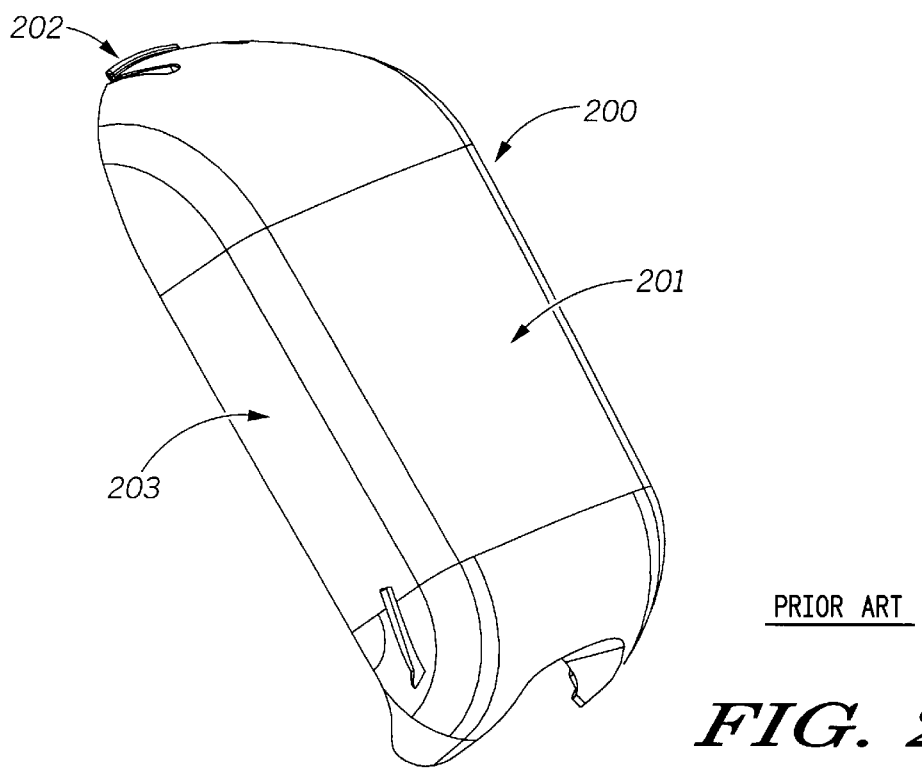
FIG. 2 is an aux battery, which is prior art, for reference puropses.

Referring now to FIG. 2, an auxiliary or "aux" battery 200 for a cellular phone is shown. The aux battery 200 has a back face 201 and a side face 203. The aux battery has mechanical contacts 202 which are used to affix the battery to a phone.

As is indicated by comparing FIGS. 1 and 2, the aux battery 200 is considerably thicker than is the slim battery 100. This is because the energy storage capacity of the aux battery 200 is greater than that of the slim battery 100. An example of an aux battery in the market is the V-Series Aux battery manufactured by Motorola, Inc. for the V-Series series phone. This battery is about 16 mm thick. It offers a 900 mAh capacity, which corresponds to about 3 hours of talk time.

Figure 3:
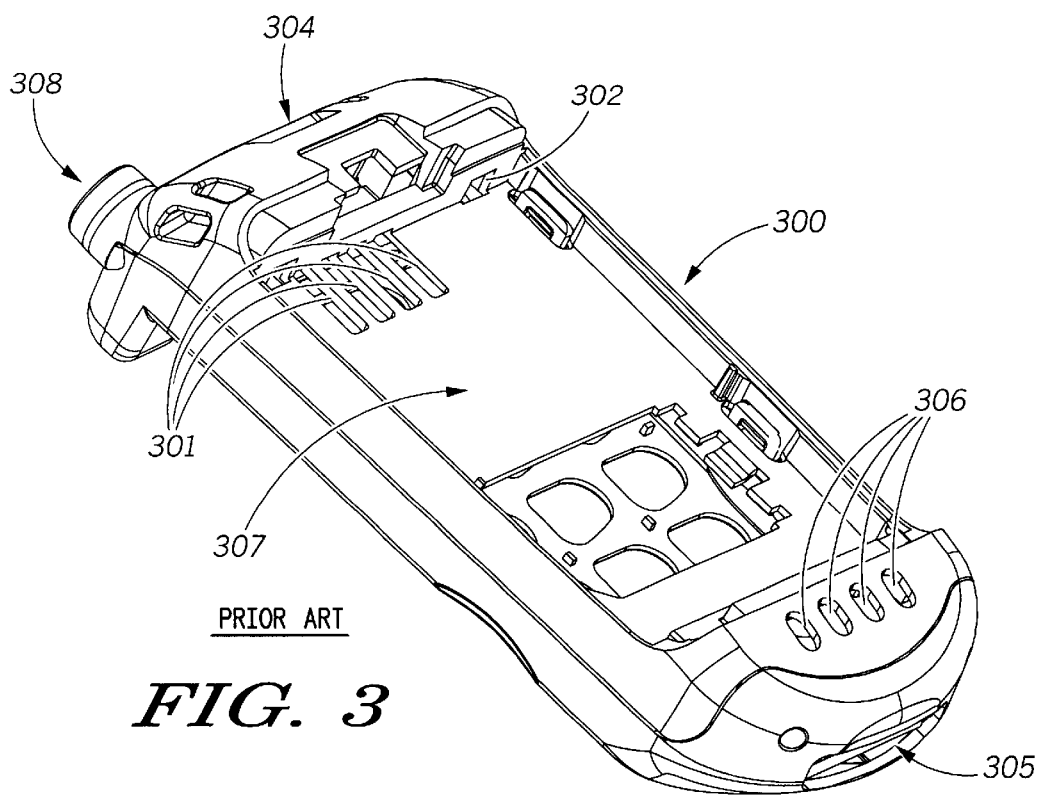
FIG. 3 is a portion of a cellular telephone, which is prior art, for reference purposes.

To complete the illustration, referring now to FIG. 3, a cellular telephone 300 is shown. The cellular telephone 300 shown is only the back portion, including a connector for an antenna 308 and a pocket for a battery 307. Also shown are electric terminals for a slim battery 301, electric terminals for an aux battery 306, mechanical connections for a slim battery 302 and mechanical connections for an aux battery 304, 305.

For the most compact, least talk time configuration, a slim battery 100 is inserted into the pocket 307 of the cellular phone 300. Here, the electrical contacts of the slim battery 101 mate with the electric terminals of the phone 301, thereby allowing power to be transferred to the phone. The mechanical contacts of the battery 102 mate with the mechanical contacts of the phone 302. This configuration, a phone 300 with a slim battery 100, provides a compact form factor.

When extra talk time is desired, one would attach the aux battery 200 atop the slim battery 100 which is seated in the battery pocket 307 of the phone 300. The mechanical contacts of the aux battery mate with the mechanical connections on the phone 304. Power is provided from the aux battery 200 to the phone 300 through the aux terminals 306. This configuration, aux battery 200 on top of a slim battery 100 in a phone 300, provides greater talk time. The trade off is that the phone is now bigger and bulkier.

In fact, in the case of the V-series phone, the form factor of the phone with an aux battery is fully 16 mm thicker than a phone with a slim battery alone. This change in form factor caused by the aux battery presents a design problem to engineers who try to develop chargers. How can one design a pocket in a charger out of rigid material that accommodates both form factors?

Figure 4:
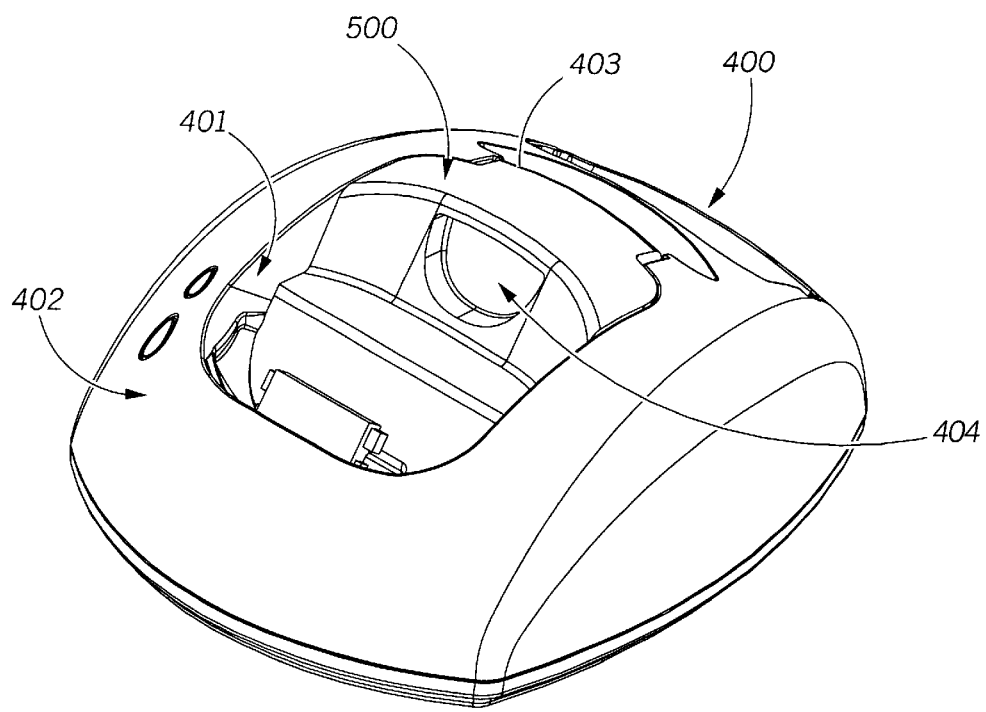
FIG. 4 is an embodiment of a battery charger with a mechanical support in closed position, in accordance with the invention.

The present invention solves this problem. Referring now to FIG. 4, a charger 400 with a mechanical support 500 in accordance with the invention is shown. The charger has an outer surface 402 and a pocket 401, into which a phone can be inserted. The charger also has mechanical connections 403 for a mechanical support 500 to be connected. The mechanical support 500 pivots about the mechanical contacts 403. In so doing, the mechanical support 500 provides a means for supporting a phone with different size batteries attached. A finger grip 404 is also illustrated. This will be further explained in the following discussion.

Both the charger and the mechanical support can be constructed of plastic, using injection molding technology which is well known in the art. In addition, other materials may be equivalently substituted including metal, wood, epoxy resin, nylon, rubber and the like. Also, the charger can contain electronic circuitry, circuit board, power supply and connectors as is necessary to charge a battery or power a phone.

Figure 5:
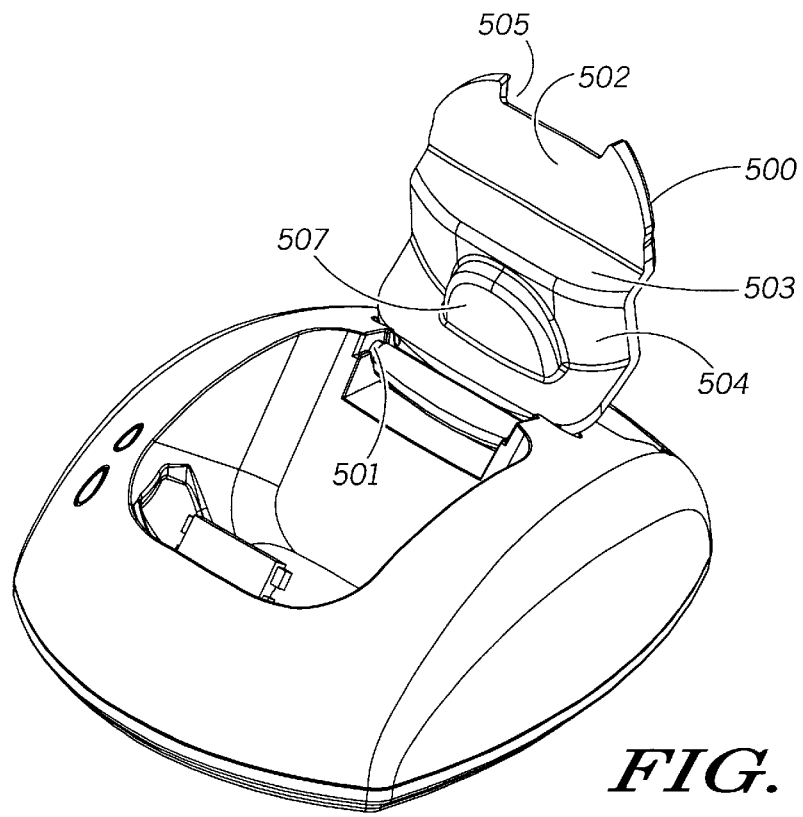
FIG. 5 is an embodiment of a mechanical support in accordance with the invention.

Referring now to FIG. 5, illustrated therein is a mechanical support 500 in accordance with the invention. The support includes several features, each with a specific function. Mechanical pins 501 are shown which provide both a means for interconnection to a charger and a means for pivoting the mechanical support 500. A first inclined surface 502 is provided to mechanically support a phone to which a slim battery is connected. A second inclined surface 504 is provided to mechanically support a phone to which an alternate battery is connected. A first horizontal surface 503 is included to interconnect the first inclined surface 502 and the second inclined surface 504, as is a second horizontal surface 506 for connecting the mechanical pins 501 to the second inclined surface 504. A finger grip 507 allows for easy rotation of the support 500 when in a charger. A indentation 505 is provided to eliminate mechanical interference between the support 500 and the phone connector of the charger.

Figure 6:
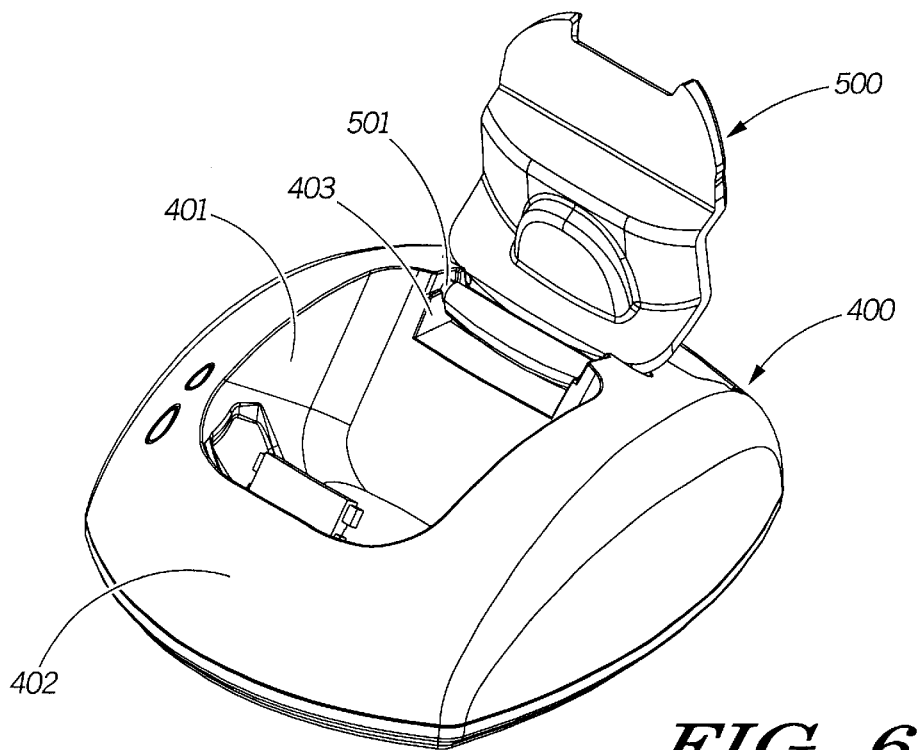
FIG. 6 is an embodiment of a battery charger with a mechanical support in open position, in accordance with the invention.

Referring now to FIG. 6, a charger 400 with a mechanical support 500 is shown therein in accordance with the invention. In this figure, the support 500 has been rotated about the mechanical pins 501 which are connected to the mechanical connection 403 of the charger 400. This rotation yields more unoccupied volume in the charger pocket 401.

Figure 7:
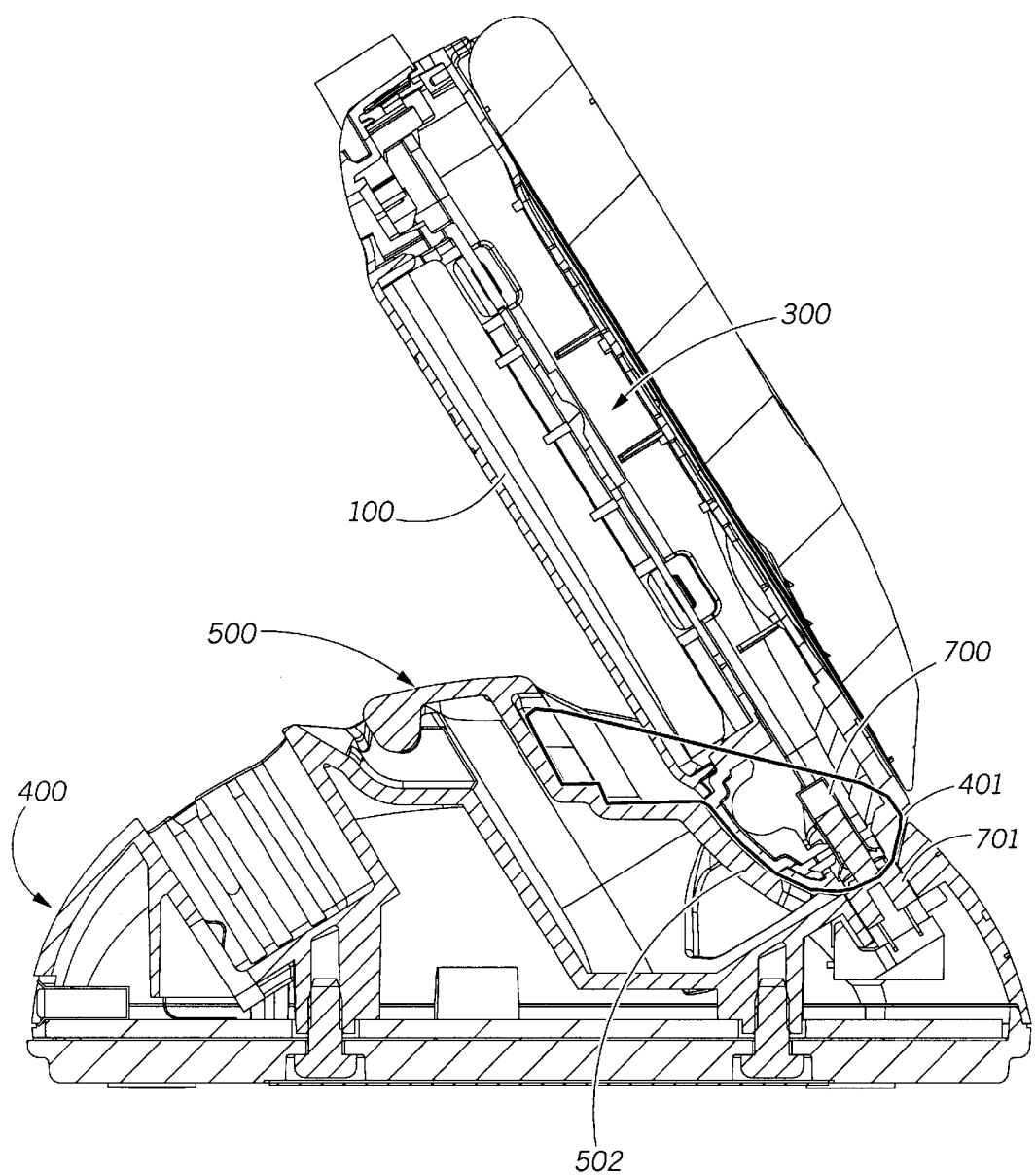
FIG. 7 is a charger with a mechanical support in accordance with the invention, with a phone with slim battery inserted in the front pocket.
Figure 8:
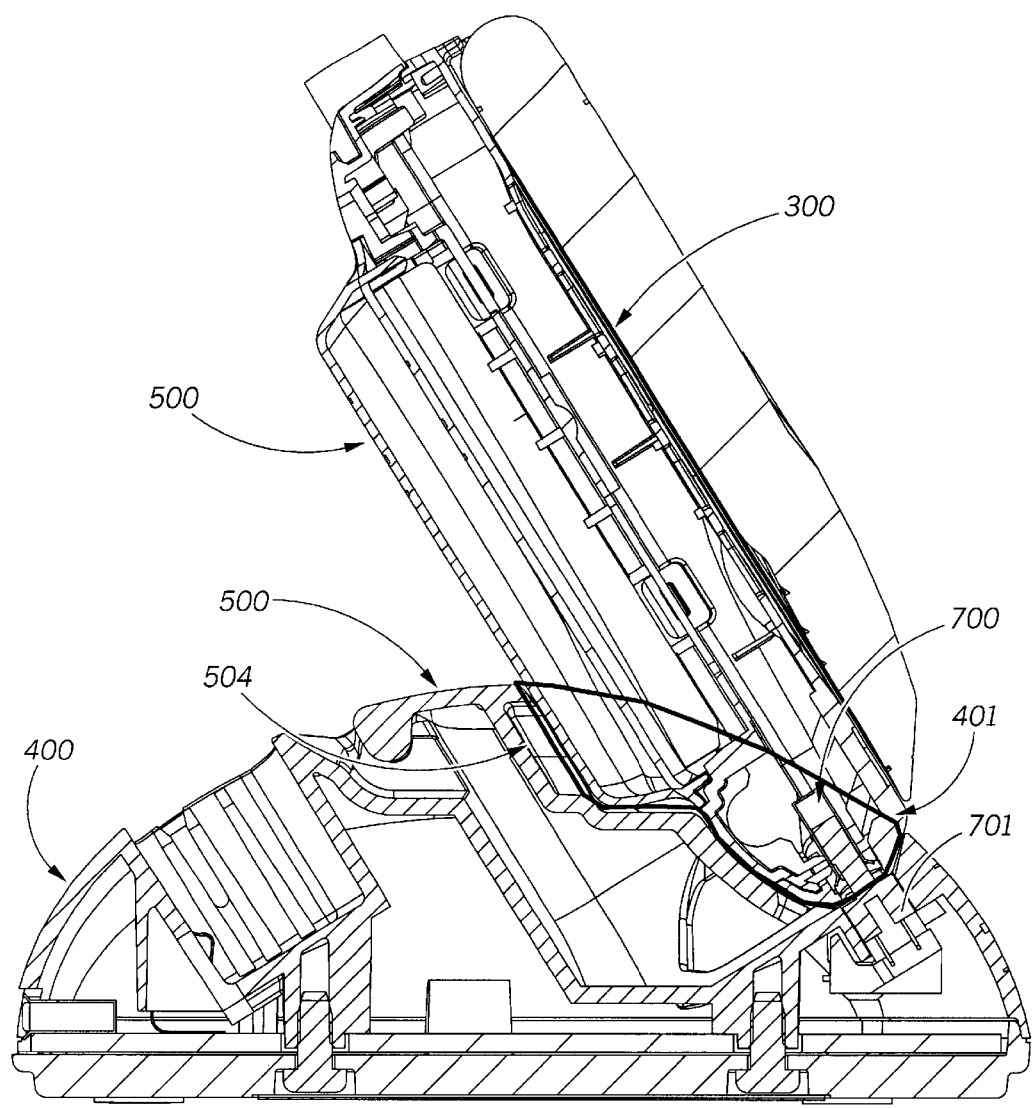
FIG. 8 is a charger with a mechanical support in accordance with the invention, with a phone with an alternate slim battery inserted in the front pocket.
Figure 9:
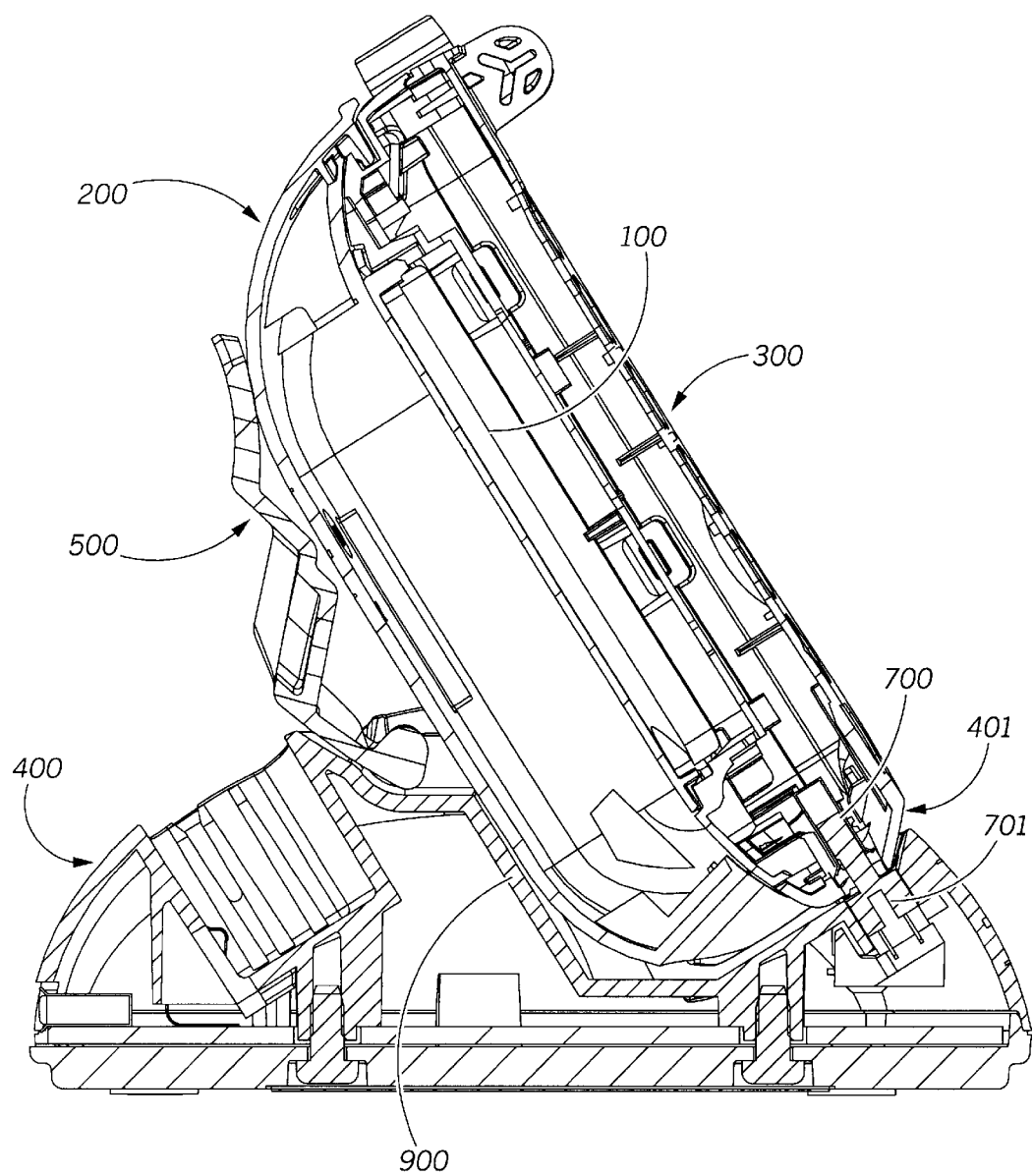
FIG. 9 is a charger with a mechanical support in accordance with the invention, with a phone with slim battery and am aux battery inserted in the front pocket.

To understand just how the device works, it is necessary to refer to FIGS. 7, 8 and 9. As recited in the previous discussion, it is understood that a variety of batteries, including a slim, alternate slim, and aux, can be connected to a phone. It is further understood that each battery gives the phone a different form factor.

Referring to FIG. 7, a phone 300 is shown seated in the pocket 401 of a charger 400 with a mechanical support 500 in accordance with the present invention. The phone 300 is connected to a slim battery 100 in the normal fashion. The phone's charger receptacle 700 is interconnected with the charger's phone plug 701. When the phone 300 has a slim battery 100 connected, it is in it's thinnest form factor. As can be seen, the phone 300 in this embodiment rests against the first inclined surface 502 of the mechanical support 500. Thus, the mechanical support 500 is providing mechanical support to the phone 300.

Now refer to FIG. 8. Illustrated therein is a phone 300 connected to an alternate slim battery 800 in a pocket 401 of a charger 400 with a mechanical support 500 in accordance with the invention. As can be seen, the phone 300 battery 800 combination has take on a thicker form factor, due to the increased thickness of the alternate slime battery 800 over that of the slim battery 100. The phone 300 still mates with the charger 400 through the charger receptacle 700 to phone plug 701 interconnect. Here, however, the phone rests on the second inclined surface 504, as opposed to the first inclined surface 502 in FIG. 7, due to the increased form factor. In this manner, the mechanical support has so far provided a means of mechanically supporting two different batteries that can be connected to the same phone.

Refer now to FIG. 9. Shown therein is a phone 300 connected to an aux battery 200 in a pocket 401 of a charger 400 with a mechanical support 500 in accordance with the invention. Note that a slim battery 100 is also connected to the phone 300. The aux battery 200 is connected over the slim battery 100. The phone again mates with the charger via the phone plug 701 to charger receptacle 700 connection.

Here, the mechanical support 500 has been rotated to its open position. Notice how the phone 300 rests against the charger pocket wall 900. The ability to rotate the mechanical support 500 to the open position allows a third battery/phone combination to be supported in the charger, in addition to those shown in FIGS. 7 and 8. Thus the charger with mechanical support provides a means for mechanically supporting a phone with several different batteries connected.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment of the present invention includes two inclined surfaces, it is clear that there could be more or less inclined surfaces on an equivalent device which still provides support for a phone with different batteries attached. Additionally, while a preferred embodiment shown is a charger for an cellular phone, the invention could be applied to any stand device that supports a portable electronic device that includes a battery. Also, while a preferred embodiment includes support for a battery, the support could be for any accessory that can be attached to an electronic device, including PDAs, holster supports, handles and the like.

What is claimed is:

1. A charger for an electronic device, comprising an integral mechanical support which rotates for supporting portable electronic devices having different form factors, the support comprising:

a. at least a first surface for supporting a portable electronic device having a first form factor when the mechanical support is in a first position relative to the charger;

b. at least a second surface, the second surface being non-coplanar with the first surface, the second surface for supporting a portable electronic device having a second form factor when the mechanical support is in the first position relative to the charger; and c. at least a third surface mechanically coupling the at least a first surface and the at least a second surface, the third surface being non-coplanar with either the at least a first or the at least a second surface.

2. A charger as in claim 1, wherein when the integral mechanical support is a second position relative to the charger, the charger supports an electronic device having a third form factor.

3. A charger as in claim 2, wherein the mechanical support further comprises pins about which the mechanical support rotates.

4. A charger as in claim 3, wherein the at least one surface comprises an inclined plane.

5. A charger as in claim 3, wherein the at least one surface comprises a horizontal surface.

6. A charger as in claim 3, wherein the at least one surface comprises a vertical surface.

7. A charger as in claim 4, 5, or 6 wherein the mechanical support further comprises a finger grip.

8. A charger for an electronic device, the charger comprising:

a) at least one pocket for accommodating at least one electrical device; and b) an integral mechanical support coupled to the at least one pocket, the mechanical support comprising at least a first surface for accommodating an electronic device having a first form factor, at least a second surface for accommodating an electronic device having a second form factor; and c) at least a third surface coupled between the at least a first surface and the at least a second surface, wherein the at least a third surface is non-coplanar with either the at least a first surface, and the at least a second surface.

9. The charger of claim 8, wherein the mechanical support is capable of being rotated from a closed position to an open position.

10. The charger of claim 9, wherein when the mechanical support is in the open position, the support accommodates an electronic device having a third form factor.

11. The charger of claim 10, wherein the mechanical support further comprises a finger grip.

12. The charger of claim 11, wherein the mechanical support further comprises pins about which the mechanical support rotates.

13. An integral mechanical support for a charger, comprising:

a. a first plane;

b. at least one pin for coupling to a charger, the at least one pin being mechanically coupled to the first plane;

c. a second plane, mechanically coupled to the first plane, the second plane forming an angle of between 0 and 90 degrees with the first plane;

d. a third plane, mechanically coupled to the second plane, the third plane being parallel to the first plane; and e. a fourth plane, mechanically coupled to the third plane, the fourth plane forming an angle of between 0 and 90 degrees with the third plane.

* * * * *